(No Model.)
W. PAUL.
DEVICE FOR CONNECTING WIRES IN ELECTRICAL APPARATUS.
No. 255,661. Patented Mar. 28, 1882.
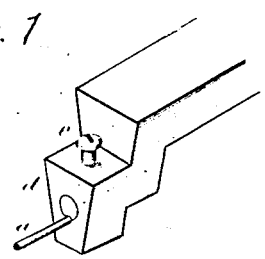
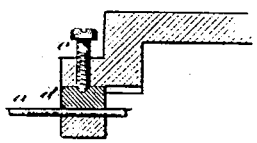 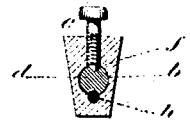
Witnesses
J. H. Shumway
Jos. P. Earle
Wm. Paul
Inventor
By atty.

UNITED STATES PATENT OFFICE.

WILLIAM PAUL, OF ANSONIA, CONNECTICUT, ASSIGNOR TO WALLACE & SONS, OF SAME PLACE.

DEVICE FOR CONNECTING WIRES IN ELECTRICAL APPARATUS.

SPECIFICATION forming part of Letters Patent No. 255,661, dated March 28, 1882.

Application filed January 25, 1882. (No model.)

*To all whom it may concern:*

Be it known that I, WM. PAUL, of Ansonia, in the county of New Haven and State of Connecticut, have invented a new Improvement in Attaching Connecting Wires in Electrical Apparatus; and I do hereby declare the following, when taken in connection with accompanying drawings and the letters of reference marked thereon, to be a full, clear, and exact description of the same, and which said drawings constitute part of this specification, and represent, in—

Figure 1, a perspective view; Fig. 2, a longitudinal section; Fig. 3, a transverse section.

This invention relates to an improvement in attaching wires in electrical apparatus. Usually the end of the wire is inserted into a hole made to receive it, then a set-screw brought to bear upon the surface of the wire, so as to bind it in place. This unavoidably indents the wire, causing it frequently to break at that point, and bringing whatever strain there may be upon the wire on that portion only which is beneath the end or point of the screw.

The object of this invention is to construct a clamp for the wire which will not affect the surface, and take a bearing over a considerable extent of that surface; and it consists in the arrangement of a cylindrical bearing-piece parallel with the aperture into which the wire is to be introduced, and cutting into that aperture, the aperture for the wire extending into the surface of the said cylindrical bearing, the opening made to receive the bearing-piece being slightly larger in diameter than the bearing-piece, and a set screw or clamp arranged to force said bearing-piece upon the wire, as more fully hereinafter described.

In the illustration I represent the attachment as made in connecting one of the wires in an electric machine, *a* representing the wire. I first bore a hole, *b*, near to and parallel with the aperture to be made for the wire, and so as to cut into the portion where that aperture for the wire is to be made. This hole *b* is of larger diameter than the wire. Into this hole *b*, I place a cylindrical bearing-piece, *d*, of slightly smaller diameter than the hole, so that there may be a little play to this bearing-piece. This bearing-piece is secured by a set-screw, *e*, inserted to bear thereon, the point of the screw entering a corresponding cavity, *f*, in the bearing-piece; and in order to bear toward the wire the bearing-piece thus held I bore the aperture *h* for the wire, cutting into the bearing-piece, so that a part of the aperture for the wire is in the part to which the wire is to be attached and the remainder in said bearing-piece. The screw loosened, the end of the wire is inserted into the aperture *h;* then the bearing-piece forced down upon it clamps upon the wire throughout the length of the bearing-piece. This will not mar the surface of the wire in the slightest degree, but holds it firmly and brings the strain upon the whole length of the bearing-piece instead of upon a single point, as when the screw only is used. The extension of the screw into the bearing-piece prevents the accidental removal of that piece when not clamped upon the wire.

By making the bearing-piece cylindrical, so that only a round hole is required to be bored for its introduction and seat, the expense is so slight in addition to what is required for the screw as not to be worthy of consideration, certainly when the advantages of this method of attaching the wire over the previous set screw arrangement are considered.

I claim—

1. The herein-described device for connecting wires in electrical apparatus, consisting in the cylindrical bearing-piece arranged in a correspondingly-shaped opening parallel with the wire-aperture, a portion of the wire-aperture being formed in the said cylindrical bearing-piece, and mechanism, substantially such as described, to clamp the said bearing-piece upon the wire, substantially as described.

2. The herein-described device for connecting wires in electrical apparatus, consisting in the cylindrical bearing-piece arranged in a correspondingly-shaped opening parallel with the wire-aperture, a portion of the wire-aperture being formed in the said cylindrical bearing-piece, with a set screw, its end resting in a cavity in the surface of the bearing-piece, substantially as and for the purpose described.

WM. PAUL.

Witnesses:
W. L. RIANHARD,
F. L. GAYLORD.